US009311829B2

(12) United States Patent
Kane (10) Patent No.: US 9,311,829 B2
(45) Date of Patent: Apr. 12, 2016

(54) POINT OF SALE MANUFACTURE OF PRODUCTS WITH A GENERAL DECAL AND PERSONALIZED LABEL INCLUDING SECURITY CODE

(71) Applicant: Design Master Associates, Inc., Toano, VA (US)

(72) Inventor: David J. Kane, Arlington Heights, IL (US)

(73) Assignee: Design Master Associates, Inc., Toano, VA (US)

( * ) Notice: Subject to any disclaimer, the term of this patent is extended or adjusted under 35 U.S.C. 154(b) by 0 days.

(21) Appl. No.: 13/962,682

(22) Filed: Aug. 8, 2013

(65) Prior Publication Data

US 2014/0070008 A1    Mar. 13, 2014

Related U.S. Application Data

(63) Continuation-in-part of application No. 13/706,735, filed on Dec. 6, 2012, now abandoned.

(60) Provisional application No. 61/567,441, filed on Dec. 6, 2011, provisional application No. 61/610,814, filed on Mar. 14, 2012.

(51) Int. Cl.

| | |
|---|---|
| *B44C 1/165* | (2006.01) |
| *G09F 3/10* | (2006.01) |
| *G09F 3/02* | (2006.01) |
| *G06K 19/00* | (2006.01) |
| *G09F 3/00* | (2006.01) |

(Continued)

(52) U.S. Cl.
CPC .............. *G09F 3/0297* (2013.01); *B44C 1/105* (2013.01); *G06K 19/06037* (2013.01); *G09F 3/0288* (2013.01); *G09F 3/10* (2013.01); *B32B 2519/00* (2013.01); *G09F 2003/0272* (2013.01)

(58) Field of Classification Search
CPC ....... G09F 3/0297; G09F 3/0288; G09F 3/10; G09F 2003/0201; G09F 2003/0208; G09F 2003/0216; G09F 2003/0217; G09F 2003/023; G09F 2003/0257; G09F 2003/0264; G09F 2003/0272; G09F 2003/0273; G09F 2003/0285; A47G 19/2227; B65D 23/14; B65C 3/06; B65C 3/08; B44C 1/1754; B44C 1/1758; B44C 1/105; B44C 1/162; B44C 1/1708; B44C 1/172; B44C 1/1725; B44C 1/1729; B44C 1/1733; B44C 1/1741; B32B 2519/00; G06K 19/00; G06K 19/041; G06K 19/06009; G06K 19/06037; G06K 19/0772; G06K 19/07722; G06K 19/07758; G06K 19/0776
USPC .............. 235/487, 488; 283/81, 71, 100, 101; 40/306, 310, 312, 324, 360, 630, 638; 428/40.1, 41.5, 41.7, 41.8, 42.1, 343, 428/354, 355 RA, 914
See application file for complete search history.

(56) References Cited

U.S. PATENT DOCUMENTS 1,930,988 A * 10/1933 Townsend ........................ 217/40
3,451,517 A *  6/1969 Wahlberg ...................... 194/219

(Continued)

*Primary Examiner* — Michael G Lee
*Assistant Examiner* — Suezu Ellis
(74) *Attorney, Agent, or Firm* — Berggren Law Offices, LLC; William R Berggren (57) ABSTRACT

A method for personalized labeling of decal decorated item at a point of sale for consumer by laminating a personal label on or adjacent a preexisting decal applied to the item. The personal label may comprise an access code to a secure information source, identification information or a greeting.

14 Claims, 11 Drawing Sheets

(51) Int. Cl.
   *G06K 19/06*      (2006.01)
   *B44C 1/10*       (2006.01)

(56) References Cited

U.S. PATENT DOCUMENTS

| | | | | |
|---|---|---|---|---|
| 3,702,511 | A * | 11/1972 | Miller | 40/306 |
| 3,711,683 | A * | 1/1973 | Hamisch, Sr. | 235/487 |
| 4,772,512 | A * | 9/1988 | Nagafuchi | 428/331 |
| 4,872,706 | A * | 10/1989 | Brewen et al. | 283/81 |
| 5,417,790 | A * | 5/1995 | Petrou | 156/249 |
| 5,423,573 | A * | 6/1995 | de Passille | 283/71 |
| 5,686,159 | A * | 11/1997 | Langan | 428/40.1 |
| 5,873,605 | A * | 2/1999 | Kaplan | 283/71 |
| 5,902,439 | A * | 5/1999 | Pike et al. | 156/252 |
| 6,082,774 | A * | 7/2000 | Schlauch | B42D 15/00 283/67 |
| 6,177,163 | B1 * | 1/2001 | Blok et al. | 428/40.1 |
| 6,270,871 | B1 * | 8/2001 | Scholz et al. | 428/40.1 |
| 6,568,327 | B1 * | 5/2003 | Jones | B42D 15/02 101/483 |
| 6,996,546 | B1 * | 2/2006 | Giles et al. | 705/60 |
| 7,013,589 | B2 * | 3/2006 | Dickinson et al. | 40/312 |
| 7,043,053 | B1 * | 5/2006 | Patton et al. | 382/101 |
| 7,766,240 | B1 * | 8/2010 | Grant | 235/462.01 |
| 8,428,773 | B1 * | 4/2013 | Carr et al. | 700/230 |
| 8,603,278 | B2 * | 12/2013 | Moore | G09F 3/10 156/219 |
| 2003/0145945 | A1 * | 8/2003 | Kennedy | 156/289 |
| 2004/0006165 | A1 * | 1/2004 | Fakinlede et al. | 524/394 |
| 2004/0129712 | A1 * | 7/2004 | Egan | G09F 3/10 220/592.16 |
| 2004/0200106 | A1 * | 10/2004 | Campbell | G09F 3/10 40/638 |
| 2006/0197334 | A1 * | 9/2006 | Shea | F04D 25/08 283/67 |
| 2006/0249950 | A1 * | 11/2006 | Kenney | B42D 15/0093 283/81 |
| 2007/0095707 | A1 * | 5/2007 | Yahiel | B65D 23/085 206/459.5 |
| 2009/0242631 | A1 * | 10/2009 | Wishnatzki et al. | 235/385 |
| 2009/0266735 | A1 * | 10/2009 | Moore | G09F 3/0288 206/459.5 |
| 2010/0127490 | A1 * | 5/2010 | Novack et al. | 283/71 |
| 2010/0282825 | A1 * | 11/2010 | Wang | 229/92.8 |
| 2012/0031545 | A1 * | 2/2012 | Vaccaro | G09F 1/00 156/153 |
| 2012/0232970 | A1 * | 9/2012 | Kara | 705/14.4 |
| 2013/0206848 | A1 * | 8/2013 | Kane | 235/494 |

* cited by examiner

POINT OF SALE MANUFACTURE OF PRODUCTS WITH A GENERAL DECAL AND PERSONALIZED LABEL INCLUDING SECURITY CODE

CROSS REFERENCE TO RELATED APPLICATIONS

This is a continuation-in-part application of Ser. No. 13/706,735 filed Dec. 6, 2012 entitled "Point of Sale Manufacture of Products with a General Decal and Personalized Label Including Security Code" and incorporating by reference and claiming priority to provisional application Ser. No. 61/567,441 filed Dec. 6, 2011 entitled "Point of Sale Manufacture of Products with a General Decal and Personalized Label" and Ser. No. 61/610,814 filed Mar. 14, 2012 entitled "Point of Sale Manufacture of Products with a General Decal and Personalized Label Including Security Code".

BACKGROUND OF THE INVENTION

In a principal aspect the present invention relates to a product, such as a ceramic mug, which incorporates a generic decal with a personalized label as part of or on the generic decal affixed to the product. The invention relates to the product and method for manufacture of the product.

Numerous items are sold and distributed as novelties or as memorabilia. For example, decorated mugs, glass containers or drinkware, stainless steel containers or drinkware, porcelain plaques, key chains and many other items of a similar nature are distributed as memorabilia. As such, decoration for items of this nature may include a decal or otherwise imprinted image thereon. The image typically is a generic image which is applied to the item as a decal. As a consequence, such items are not necessarily personalized with a name, date or other information associated with the purchaser of the item.

To personalize such items for marketing at a point of sale, purveyors prepare or have others prepare numerous alternative personalized items which include a generic design or scene coupled with a unique feature such as a name. Consequently, the purveyor is required to maintain a large inventory of the prep-personalized items. Even in such a circumstance not all likely or possible unique personalized features, such as a person's name, will be maintained in an inventory.

Thus, there has developed a need for methodology by which novelty items and other memorabilia can be personalized at a point of sale in an efficient and inexpensive manner without employing highly skilled or highly trained workers.

There has also developed a need to provide means for identifying the person who has acquired the personalized item. For example, if the person receiving or procuring the item is injured or lost, the item may provide a confidential means for identifying that person as well as a means to enable that person or an aid worker to have access to helpful information.

Further, there has developed a need to provide an improved methodology by which useful items, as well as novelty items and other memorabilia, can be personalized for purposes of safety, security and identification of the individual or individuals associated with the item. By way of example and not limitation, personal identification cards, having information related to an individual useful for identification purposes and for the purpose of storing and providing information associated with that individual, are becoming a necessary and useful, highly efficient means to store information or have access to information associated with unique individuals. Thus, personalization of various items may have a utilitarian aspect with respect to memorabilia, but also with respect to a catalog or source of information that may be unique to an individual and provide assistance to an individual with respect to their business, travels, lifestyle and the like. In that regard, personalization of various items as discussed hereinafter, particularly identity cards and items wherein identity becomes an important factor associated with an individual, become more and more important in the cosmopolitan world.

SUMMARY OF THE INVENTION

Briefly the present invention provides techniques and resultant products or items which incorporate a standardized label or decal that may be easily individualized or personalized at a point of sale or display by adding a personalized label at the point of sale or display. The methods and products of the invention enable use of safe, organic, material decals wherein a large inventory of the generic design starting products may be generated and maintained for transfer to point of sale sites for application of personalization to the item upon distribution or sale of the item at some later date.

As an aspect of the invention, the inventory of products previously labeled with a generic design may be personalized by affixing a label to a designated region or portion of the item on which a generic decal or design has been placed. For example, the name of the individual purchasing the product, a certain date or location or other information may be imprinted on a label or tape which is then attached or affixed to the generic decal that is already in place, affixed to the product.

As another aspect of the invention the generic decal may be made of an organic material which includes resin that facilitates, in a synergistic manner, the application of a customized or personal label.

As a further aspect of the invention the label may be customized at the point of sale, and as an additional aspect the customized label may comprise a laminate of multiple layers of protective plastic materials.

As yet a further aspect, a label that includes an acrylic adhesive provides especially strong adherence of the personalized label to a decal or equivalent generic design element.

As yet another aspect of the invention, acrylic adhesive alone or in combination with resin associated with a generic label attached to the item maintained in inventory facilitates adherence and retention of the label on the item or product which is being personalized.

As yet another aspect of the invention a separate polyurethane protective layer may be placed over the label prior to affixation to the personal label on the item or subsequent to placement of the label on the decal or design on the product or item at a point of sale.

As an aspect of the invention is the point of sale distributor of the product no longer needs to maintain multiple items in inventory which are pre-labeled with personalized names, dates or the like. The process and the product enable purchasers of an item to create the personalized text and/or the message that they wish to include on the product within a designated space of a design or decal in a prompt and efficient manner. Unnecessary inventories of pre-labeled products may therefore be avoided.

As another aspect of the invention, multiple types of products including containers, plaques, tags and the like may be prepared using the techniques of the invention wherein the surface area of the item to be personalized will include a generic decal and is personalized at the point of sale by printing and application of the label in accord with the consumer's desire.

As another aspect of the invention, the personalized label may include a personalized code which is machine readable and may provide helpful information for the person or about the person. Thus, the personalized label or tape may enable access to health records, personal information, or general information that the person may find useful. Application of the personalized label on a key tag, name tag, jewelry item or any other item may thus be relied upon to provide emergency information unique to the person possessing the item.

As a further aspect of the invention, there are multiple ways in which to prepare the personalized label. A common feature or aspect of the multiple ways to prepare the personalized onsite or worksite label relies upon the utilization of a specially designed adhesive transfer that is laid down on a substrate. The framed adhesive transfer is, in fact, a transfer which has been debossed so that a rib or frame is shaped into the transfer. The underside of the adhesive transfer includes an adhesive material for application to a substrate which typically comprises or may comprise a generic decal. The topside of the transfer incorporates the raised peripheral frame created by debossing or shaping the interior of the framed particular transfer. The transfer is then laid down on the substrate surface and a protective cover coat is peeled from the transfer. Thereafter, a tape having a label applied thereto may be fitted within the frame by peeling the backing away from the tape, placing it within the frame into the debossed, framed area.

As an alternative, a tape material may be printed, placed and adhered on a designated area of a decal substrate following removal of a backing from the tape. Upon placement of the personally labeled tape on the substrate, a rub-on adhesive transfer is laid over the personalized tape to protect the tape. The adhesive transfer comprises an underlayment or bottom layer of adhesive and a clear layer of transparent film with a raised color contrast border, or alternatively without a border, placed over the personalized label on the substrate.

Thus, as an aspect of the invention, a framed, rub-on transfer, or a transfer with a frame, may be positioned over a tape placed on the substrate, or may alternately define a frame into which the tape is positioned. As an aspect of the invention, the transfer applied to the substrate may include tabs or sections which surround the frame portion. The tabs or sections exclude an adhesive on the underside and thus may help facilitate positioning of the transfer, yet may be removed once the transfer is positioned so that the adhesive associated with the frame section of the transfer will retain the transfer on the substrate decal designated area.

In sum, there are at least three separate embodiments, aspects, features and benefits of the process and product of the invention as defined in greater detail hereinafter. As a first embodiment, there is depicted a product that is to be labeled with a personalization statement such as a name, greeting or the like. A generic decal having a colored background or a background of a desired hue or color is applied to an item such as a mug. This step can be performed at a manufacturing site. To personalize an item (mug) at a point of sale site, a special tape is applied as an overlayment to the generic decal designated area. The process and materials for creating a special adhesive tape overlayment is described hereinafter.

As a further aspect or embodiment of the invention, the personalized item begins with the same initial step of providing a product with a generic decal or label thereon. The background of the label has a separate desired region or designated area of a desired color or hue. Next, there is positioned on that background a personalized label using a technique, process and materials as described with respect to the first embodiment. Thereafter, a transfer is applied over the personalized section. The transfer is debossed and includes a raised border which surrounds the personalized visual label and provides a protective layer for that label or tape. Additionally, the transfer layer is typically transparent within the interior of the border area to enable visual inspection of the personalized tape. The transfer material includes an adhesive section that is co-terminus with the border or frame imprinted on the transfer. Further, the transfer is embossed or may be embossed to define a section recessed coincident with the interior of the frame portion. The transfer includes a top carrier film which may be attached releasably to the main frame portion of the transfer. The border layer of the top carrier film surrounds the frame area and further includes a pull tab along at least one side thereof to enable gripping, pulling and effecting release of the protective circumscribed portion of the transfer and enables delamination or separation of the outer layer entirely from the recessed frame portion of the transfer.

In a third embodiment and aspect of the invention, the generic decal is again provided on the item (e.g., a mug) with an appropriate color or hue background and designated area at a manufacturing site. A debossed material carrier with a transfer frame of the type described above is then positioned over a desired or designated area of the decal at the point of sale site or a remote processing site. The frame is visible inasmuch as it employs a contrasting color relative to the decal designated area. The frame forms a periphery which will surround a personalized distinct designated area on the product. The interior of the frame is typically a desired hue or transparent. A further layer is then positioned within the frame; namely, a personalized tape as described with respect to the first embodiment. The frame is embossed or debossed so that the frame portion defines a raised or otherwise distinct look, contrast and feel layer relative to the interior of the frame. This facilitates placement of the personalized labeled tape within the framed portion of the layer from delaminating; particularly the edges of the tape adhered to the interior of the frame will be prevented from releasing or delaminating from the layer comprising the frame. The carrier of the frame may also be removed once the frame portion of the layer is adhered to the designated area. Further, an additional protective, transparent tape may then be placed over the personalized tape.

These and other objects, advantages, aspects and features of the invention will be set forth in the detailed description which follows.

BRIEF DESCRIPTION OF THE DRAWING

In the description which follows reference will be made to the drawing comprised of the following Figures.

DESCRIPTION OF EMBODIMENTS OF THE INVENTION

Figure 1:
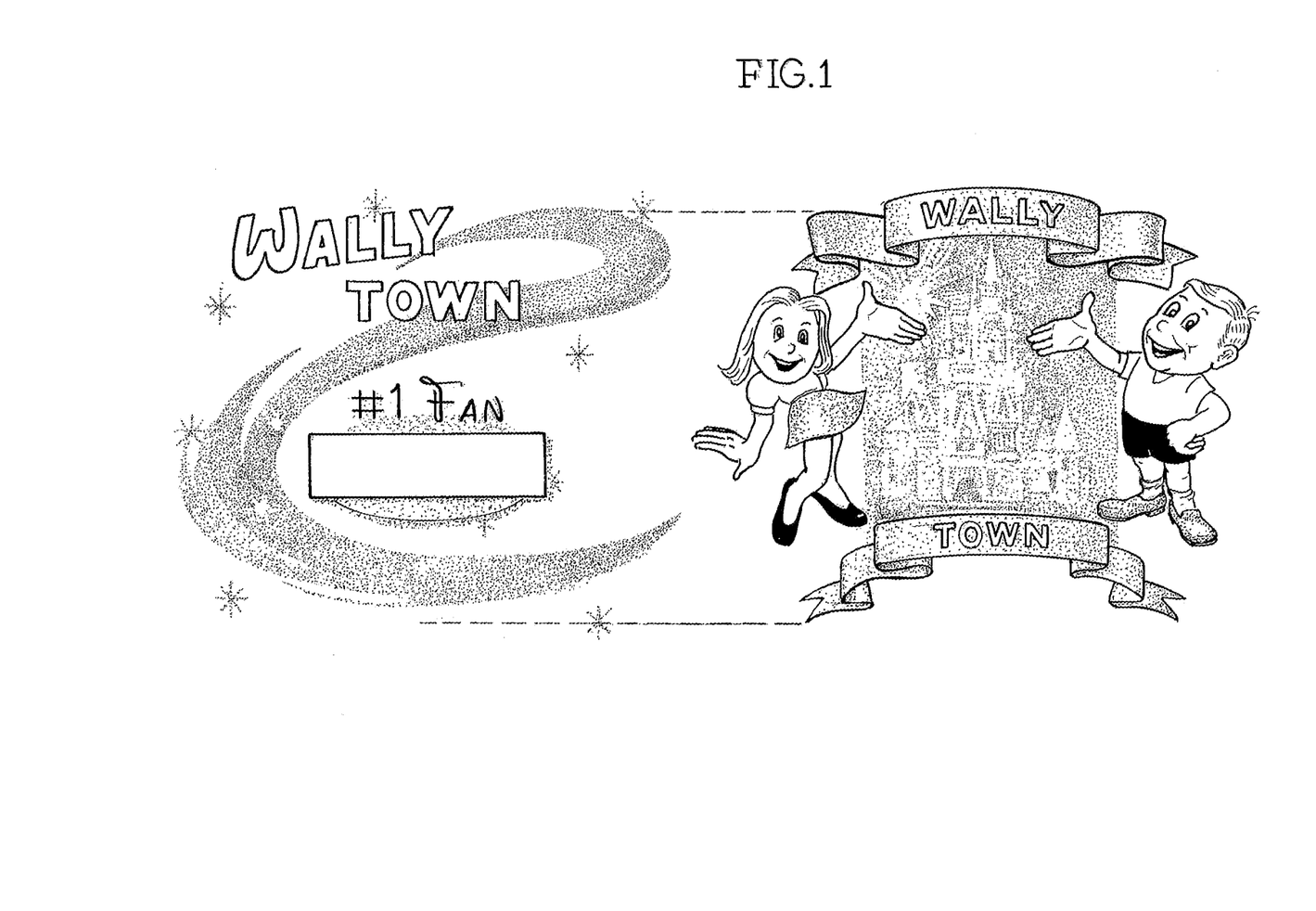
FIG. 1 is an exemplary specimen of a decal which may be applied to a container such as a ceramic mug.
Figure 2:
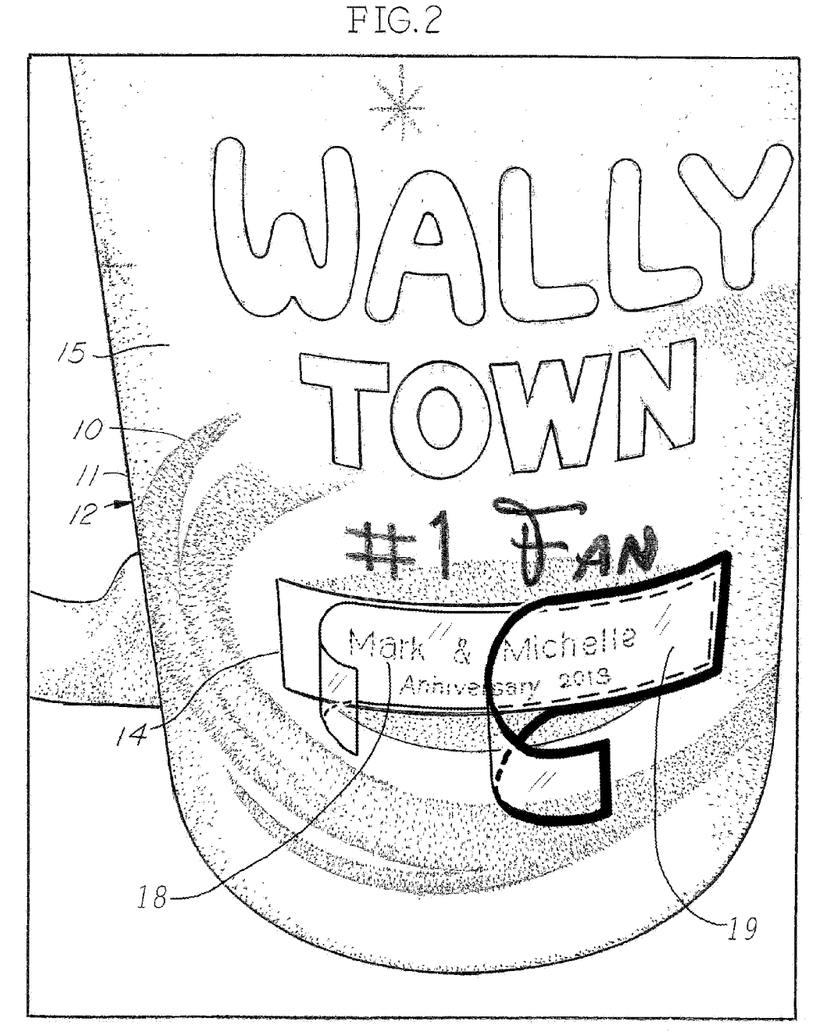
FIG. 2 is an isometric view of the decal of FIG. 1 as applied to a ceramic mug wherein an individually personalized label has been affixed thereto.
Figure 3:
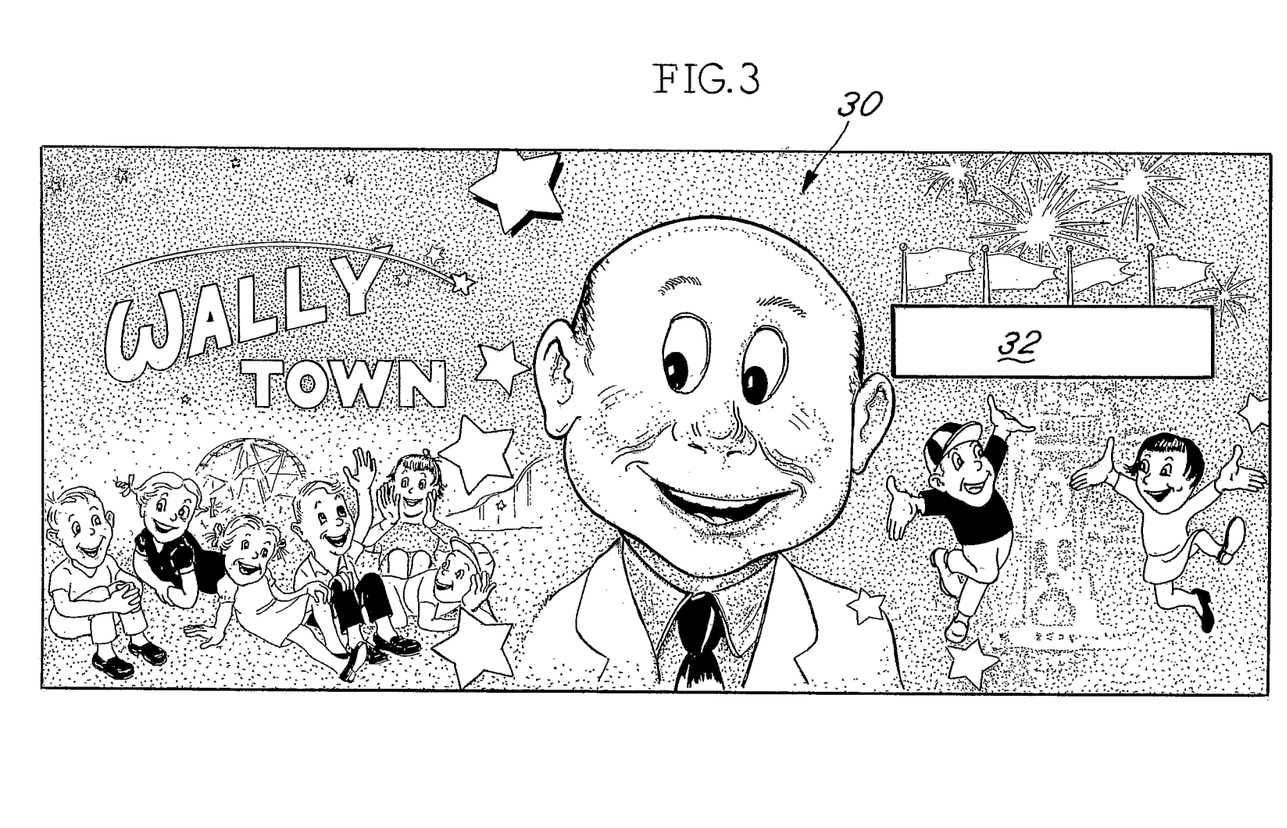
FIG. 3 is a view of yet another decal which may be applied, for example, to a mug such as a ceramic mug and which further includes a designated area for application of a personalized label.
Figure 4:
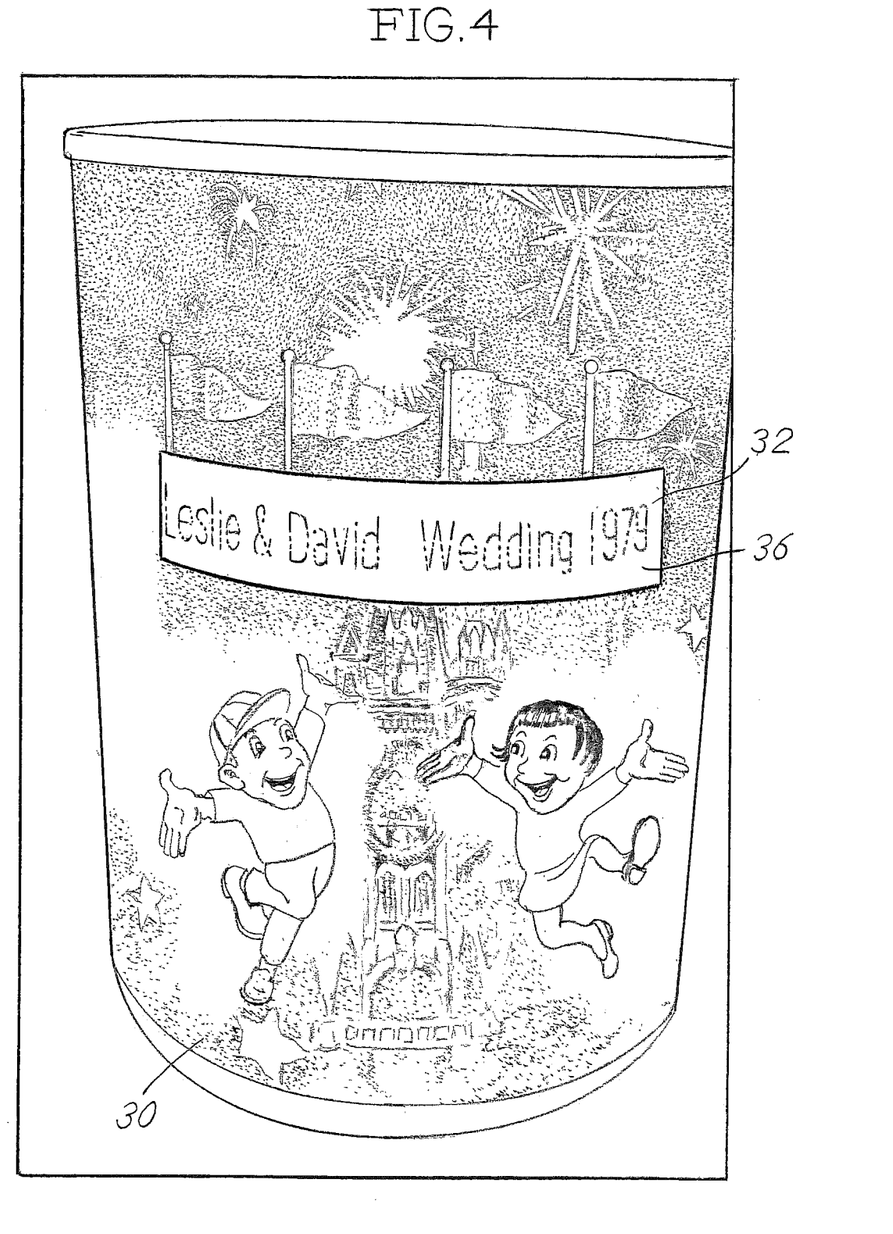
FIG. 4 is a view of a mug as shown in FIG. 3 having a generic decal applied thereto and further including a personalized label affixed to the decal.
Figure 5:
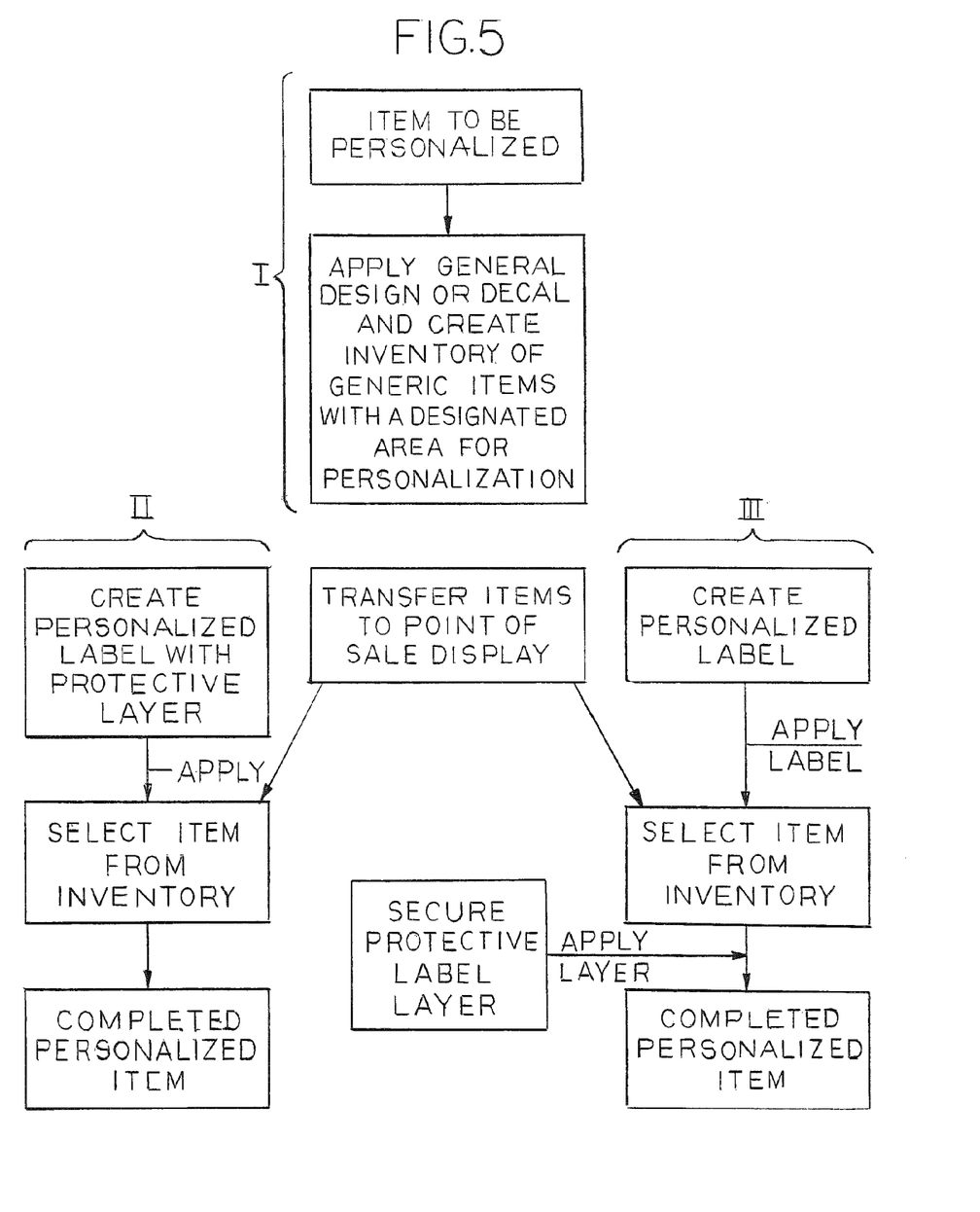
FIG. 5 is a flow chart illustrating steps in the practice of embodiment of the invention.

Referring to FIGS. 1-4, two examples of embodiments of the invention are depicted. FIGS. 1 and 2 illustrate a first embodiment. FIGS. 3 and 4 illustrate a variation of the first embodiment. FIG. 5 is a flow chart illustrating methodology of the invention of the first embodiment and the alternative of FIGS. 1-4 which enables point of sale creation of a personalized message or statement on an item having a generic design.

Referring to FIGS. 1 and 2 and in particular FIG. 1, there is illustrated a two part decal 10. The decal 10 is in a generic form and includes a consistent, common, thematic visible illustration which is incorporated in the decal 10. The decal 10 itself may be any of a number of known decal types. Preferably as an aspect of the invention, an organic material decal may be used to address environmental and toxicity concerns and may be, for example, lead free. In any event, the illustrative decal 10 is affixed to an outside surface 11 of a container 12 such as a mug. Various brands and types of decals may be affixed to the outside surface of the item using conventional alignment techniques such as alignment jigs.

There are numerous decorating processes to decorate drinkware, glassware, ceramic ware, stainless items, plastic, porcelain and the like with decals that may be utilized in the practice of the invention. These techniques are utilized to attach and maintain attachment of a decorative item such as a decal on a surface of the item. Items other than drinkware are within the scope of these concepts.

In general, there are four approaches to the creation of, and placement of, a design decal on an item. The first methodology is a high fired decal process wherein a glass fit is used in the process. Thus, a decal is printed using a four color process water slide decal. It is applied to a surface or substrate of the item that is being decorated. The decoration can be a spot decorating one side of the item, a portion of the item, or may fully enclose or wrap around the item. The decal is fired at a relatively high temperature for melting to form a glaze on or in the substrate. The decal, when so applied, is scratch resistant having been tempered or fired typically at 1,500° F. or thereabouts to cure the inks comprising the decal. Such decals are used, for example, to decorate restaurant service items.

The colors which can be included in such decals often exclude deep and rich colors like red due to the high firing temperature that burn or eliminate the coloring during the process of application of the decal.

A second methodology is the application of organic low fire decals. Such decals are currently not highly popular, but in due course are likely to replace the first decal product and process described above. The process, in general, is described above with respect to the high fired decal process. The decal, however, is fired at a lower temperature in the range of 400°-500° F. This process has the advantage of utility with respect to the application of multiple colors including deep colors like red, orange and the like. This results because firing occurs at a low temperature. Durability is sacrificed and the likelihood of scratching or defacing the applied decal is more likely and thus this process is not recommended for restaurant trade items as typically provided by the first process described above. The process, however, is clearly applicable to novelties and provides the distinct advantage of enabling the use of brighter and deeper colors.

A third process for applying a generic decal is the sublimation of a full color printed transfer that through heat and pressure transferred to a substrate. Typically, the transfer needs a white background to be able to sublimate the color transferred to the substrate. For example, to provide a decal of this nature on a blue mug, typically you must apply a white decal initially and then apply a full color transfer over the white decal using this process. Unfortunately, over time the sublimation process may fade due to exposure to light.

A fourth process utilized for application of decals to various items is identified as a screen application process which requires low temperature firing. In this process, each color must be screened separately on the item. This limits the ability to obtain complicated four color decals on the item. The number of colors used in a process of this type is typically limited to three or four colors and thus is not favored with respect to more complex colored decal items.

In any event, each of these processes is designed for application to an item at a manufacturing worksite where multiple duplications of the same item with the same decal are manufactured. Personalization of the various items on a person-by-person or item-by-item basis is generally very impractical. However, it is possible to apply decals of the type described using the processes described with a generic decal design that also further include a separate decal transfer designated area for personalization either incorporated in the decal design attached or as a separate item. In essence, a designated area is provided by transferring a blank portion of a decal, a designated area of a decal, or a separate decal, such as a separate portion in the form of a banner to the item which is to be personalized in due course. The personalization of the item then is accomplished by applying a personal design, such as a name, a message, a greeting, or the like in the designated area at a point of sale or a separate worksite. To do this, the personalized label or transfer must be appropriately made so that it will be long lasting, having an appearance which strongly suggests it was part of the original creation of the application of a decal to the item, inexpensive, easy to perform, and generally as enduring as the decals applied by the techniques described above which are generic decals. In other words, the designated area of the item becomes the site for personalization and in a typical situation that designated area is in some manner distinct, yet coordinated with the generic decal which has been applied by one of the above-described techniques. A designated area is thus the area which is destined to be personalized with a name, a message or a similar aspect or feature.

Again referring to FIG. 1, the decal 10 includes a first part or section 13 which is wrapped around a portion of the container 12 and a second part or portion 15 which is wrapped around an adjacent section or part of the container 12. The second portion 15 includes an identified region or location (designated area) 14 which is designated to receive a personalized note, message or information. The designated area 14 may be a separate decal which is applied at the original manufacturing site using one of the methods described heretofore. Alternately, the designated area may be a part of the generic decal 10.

Figure 2A:
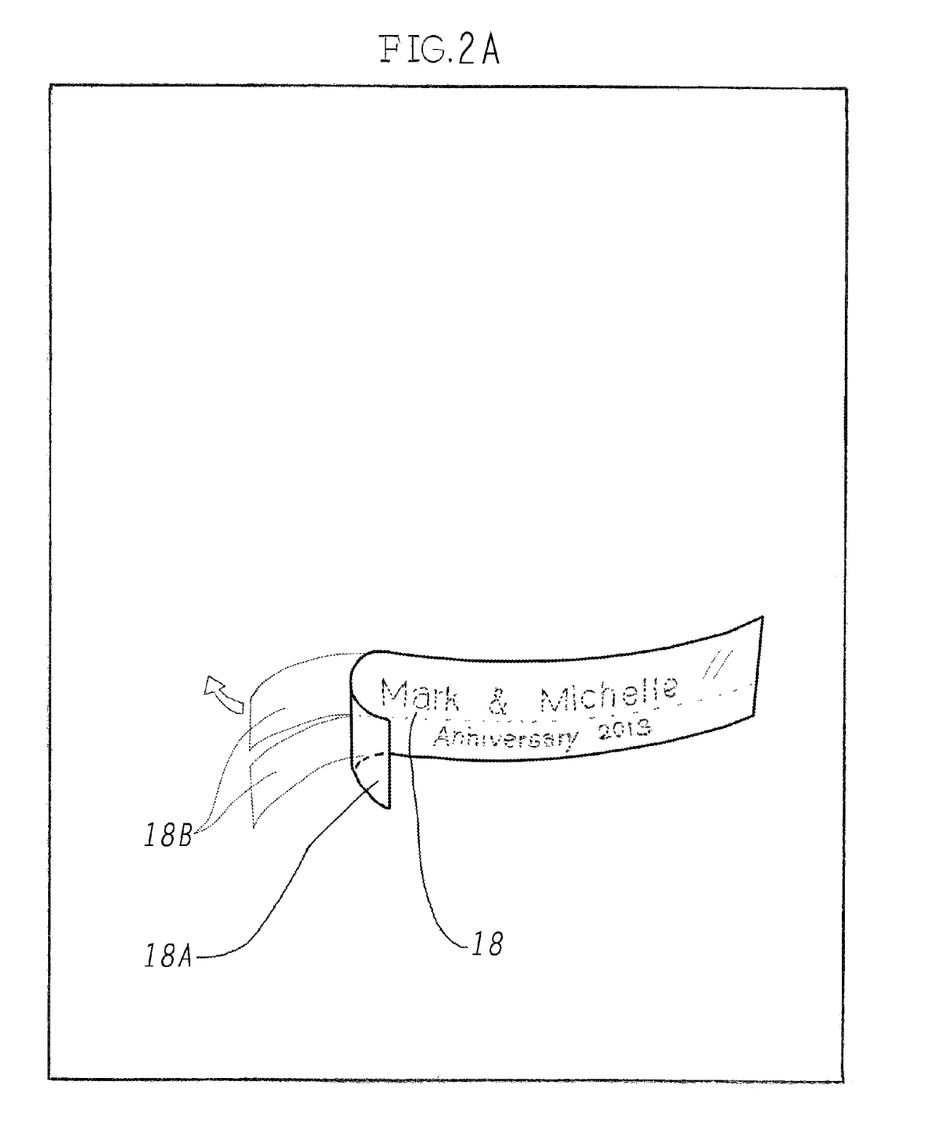
FIG. 2A is an expanded perspective view of an exemplary specimen of a multilayer laminated plastic construction comprising a specific label, an adhesive layer and a releasable backing.

FIG. 2 illustrates the application of the decal 10 to the container 12 using, for example, one of the techniques described heretofore at a manufacturing site. The region 14 for receipt of personalized information has received a specific label 18 which is adhered or affixed to the outer surface of container or item 12. Typically the decal 10 will include a resin material incorporated therein. The attached label 18 typically comprises a multiple layer laminated plastic material construction. The laminated construction includes a releasable backing 18B with an adhesive 18A such as an acrylic adhesive which attaches the releasable backing to laminated layers of plastic material forming the remainder of label 18. The label 18 is thus flexible and upon removal of the backing may be adhered in the location region (designated area) 14 of the decal 10. The acrylic adhesive 18A is, in a version of the invention, synergistic with the resin material that may be incorporated, comprise or be associated with the decal 10 to improve adherence when used in combination. FIG. 2A is an expanded perspective view of an exemplary specimen of a multilayer laminated plastic construction comprising a specific label, an adhesive layer, and a releasable backing.

The label 18 as described is a laminate such as the type TZ laminate offered by and available from Brother International Corporation as an element of its P-touch® Labeling System. A wide range of such labels 18 as well as associated labeling machines (such as available as an element of the referenced P-touch® System) permit printing on the label to provide a personal message or information such as depicted in FIG. 2. That is, the mug or container 12 may be part of inventory or pre-manufactured mugs having identical or substantially identical construction and generic design decals or elements affixed thereto. The inventory is then transferred to and maintained at the point of sale for the product. At that same point of sale, labeling equipment may be used to quickly make a personalized label 18 which is then adhered to the outside surface of the of the adhered decal 10. A benefit or aspect of the invention utilizing the P-touch System results because the custom printing or design is sandwiched between layers of laminate plastic and thus is protected from abrasion and contamination. Note that the designated area may include a design such as a border outline to facilitate proper placement of the label 18 on the decal 10 designated area.

Figure 2B:
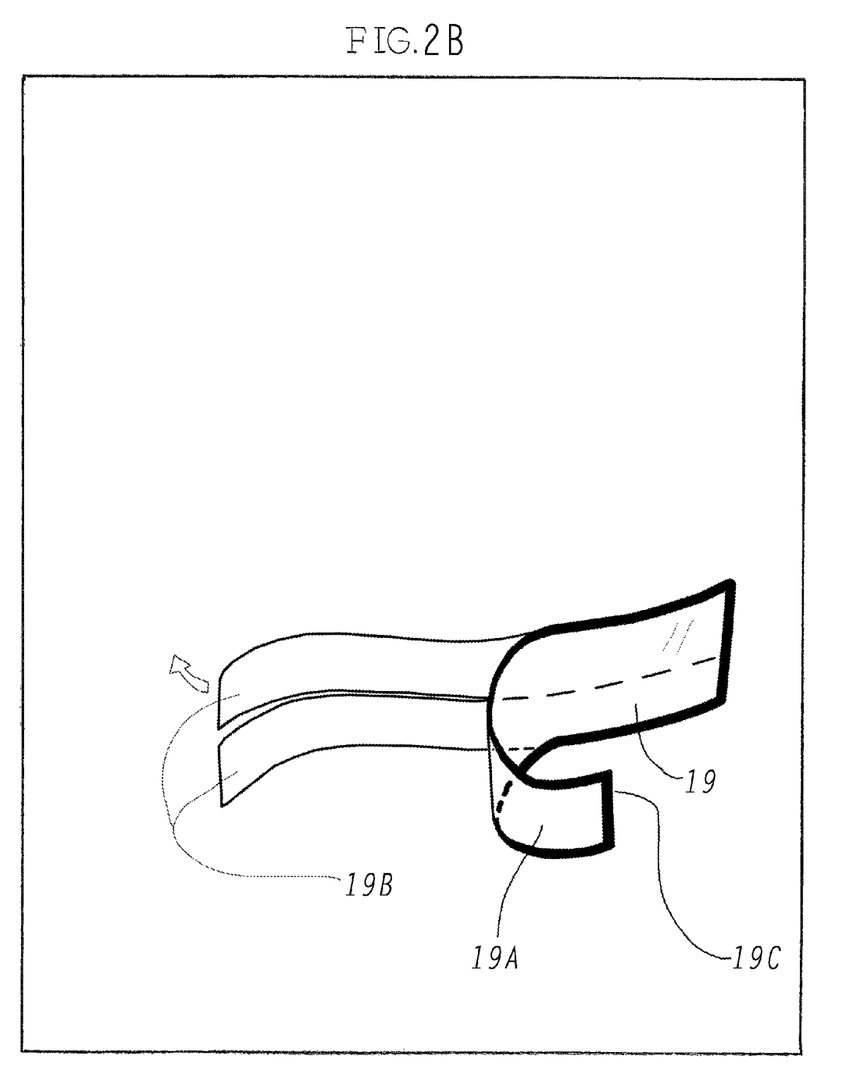
FIG. 2B is an expanded perspective view of an exemplary specimen of a polyurethane construction comprising an adhesive layer on one side against a releasable backing and an optional embossed frame.
Figure 7:
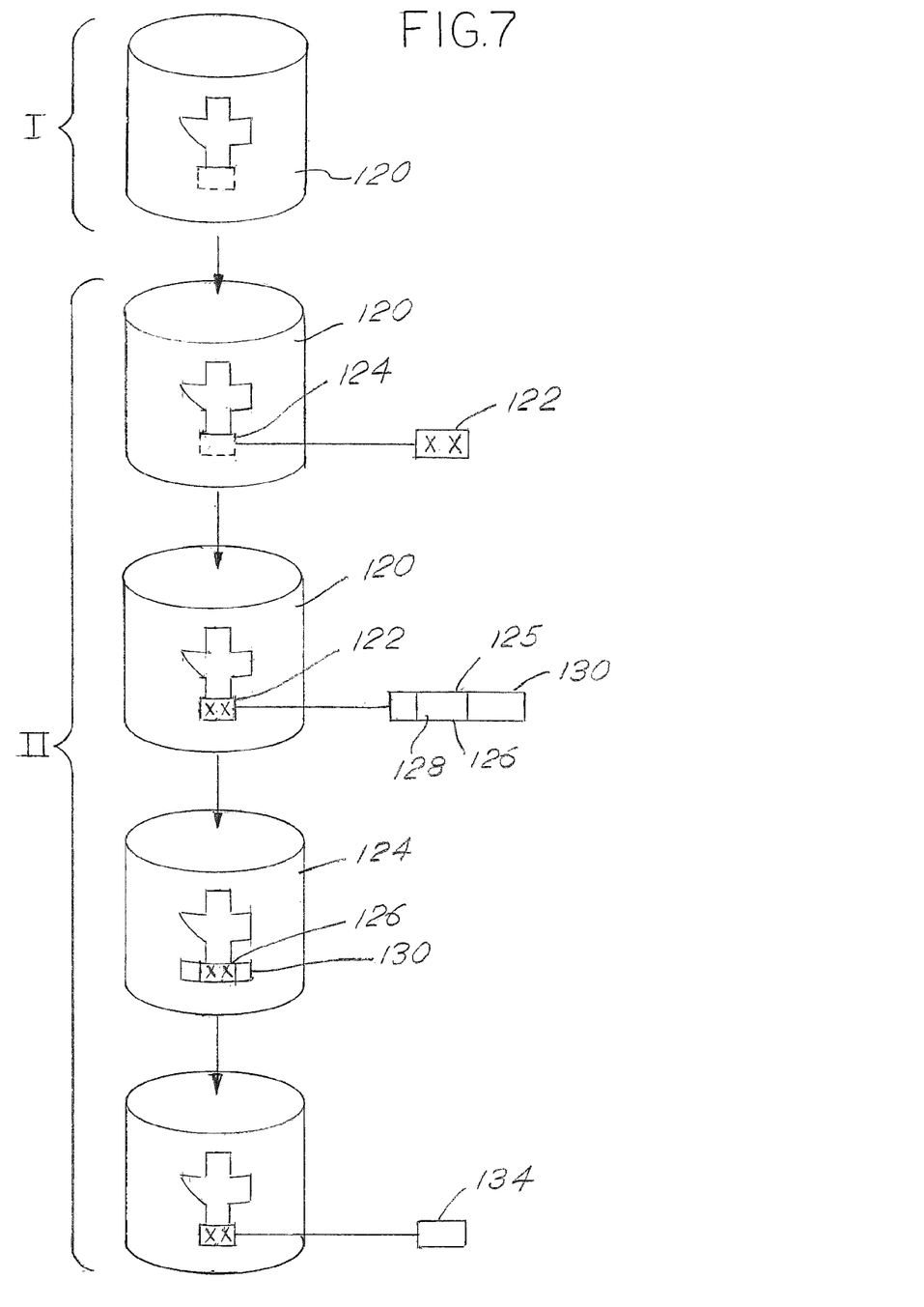
FIG. 7 is a flow diagram of the steps in the practice of the second embodiment of the invention.

As an additional feature, the label 18 may include on its outside an additional polyurethane material layer 19 such as offered by 3M Company, St. Paul, Minn. as Polyurethane Protective Tape, product number 8674. The polyurethane material layer 19 has an adhesive layer 19A on one side against a release backing 19B and optionally an embossed frame 19C as shown in FIG. 7 as embossed frame 126. FIG. 2B is an expanded perspective view of an exemplary specimen of a polyurethane construction comprising an adhesive layer on one side against a releasable backing and an optional embossed frame. Alternatively, a separate dispenser may be used to dispense a portion of a protective polyurethane material layer, such as described, to cover the affixed label 18 at the point of sale and following placement of label 18 on the decal 10. Thus, the protective layer may be pre-sized and precut to place over and on the label 18.

FIGS. 3 and 4 illustrate another embodiment wherein a decal 30 is pre-manufactured with a particular design thereon. The decal 30 includes a designated section or region 32 for attachment of a label. The decal 30 is initially placed upon a container such as a glass, metal or porcelain container 34 in FIG. 4 using conventional techniques such as described above. An inventory of such containers having a standard generic decal 30 thereon are then made available at a point of sale. A separate label 36 is then generated at the point of sale. The label 36 is of the type depicted in FIG. 2. The label 36 is positioned in the designated region or area 32.

The resultant product thus may be completed on a personalized basis at a point of sale. Utilizing the various elements described above in an embodiment of the invention enables an attendant at the point of sale to prepare the personalized item in a matter of seconds and certainly less than one minute. Thus, an item of memorabilia can be easily created at a point of sale utilizing a large inventory of starting materials, items or products which are customized at the point of sale in a straightforward, easy manner.

FIG. 5 illustrates the series of steps that occur with respect to the practice of embodiments of the invention as described with respect to FIGS. 1-4. That is, a flow chart sets forth the stages or activities that occur in a manufacturing site to create a large inventory of generic items. Step I represents the task of manufacture of a generic product such as a decorated mug. The items or starting materials (mugs) are then transferred to the point of sale where the appropriate labeling materials as described above are made available for completion in terms of the message that is to be attached to the item that is being personalized. Steps II and III represent subsequent onsite (e.g., point of sale) labeling functions or options.

Thus, with Step I a mug or some other item is created in a factory site with a general design or decal thereby creating an inventory of generic items. Importantly, a designated area on the decal or design imprinted on the item, such as a mug, is provided. That designated area will ultimately be the area wherein a personalized message or information will be provided. Typically, the designated area will be of a color or design which provides a background for imprinting a personal message or name, by way of example. Thus, if the personal information is on a transparent or translucent carrier, it will have a background which highlights the personal item or information.

The steps identified as Step II and Step III are the steps previously described to create a personalized, attached label which is affixed to the general decal design on step the item (mug). As noted, there are two pathways as previously described. Pathway Step II calls for the creation of a personalized label with a protective layer thereon applied to a selected item from inventory wherein the application is on or at the designated area for personalization.

The alternative approach is labeled Step III. The personalized label is applied to the designated area of the decal that has been applied to the mug. Note, that a separate decal for the personalization or designated area may be utilized. That is, a banner or some other contrasting designated area may be utilized by application to the item (mug). In any event, the personalized label will first be placed upon and affixed to the designated area for personalization. Thereafter, as a separate step, a protective label layer is affixed over the personalized label. The protective layer is, by way of example, as previously described and is transparent or translucent so that the personalized message or feature may be observed.

As previously described, various types of materials may be used for the decals that are initially applicable or bonded to the item (e.g., mug) including the following: waterslide decals, appliques and any adhesive adhered generic label.

Also the labeling materials may be utilized and provided from various sources. A particularly useful source is the P-touch System tapes and associated elements previously referenced. Such tapes are available in multiple sizes and colors and may be imprinted with multiple designs, graphics and printing in various languages.

The material which provides a protective layer over the label may be provided as a tape which is applied after the label is applied or alternatively may comprise the outer surface of the tape that is provided in the second step set forth above. More specifically the polyurethane materials as sourced from 3M Company provide excellent protection for the labels.

Figure 6:
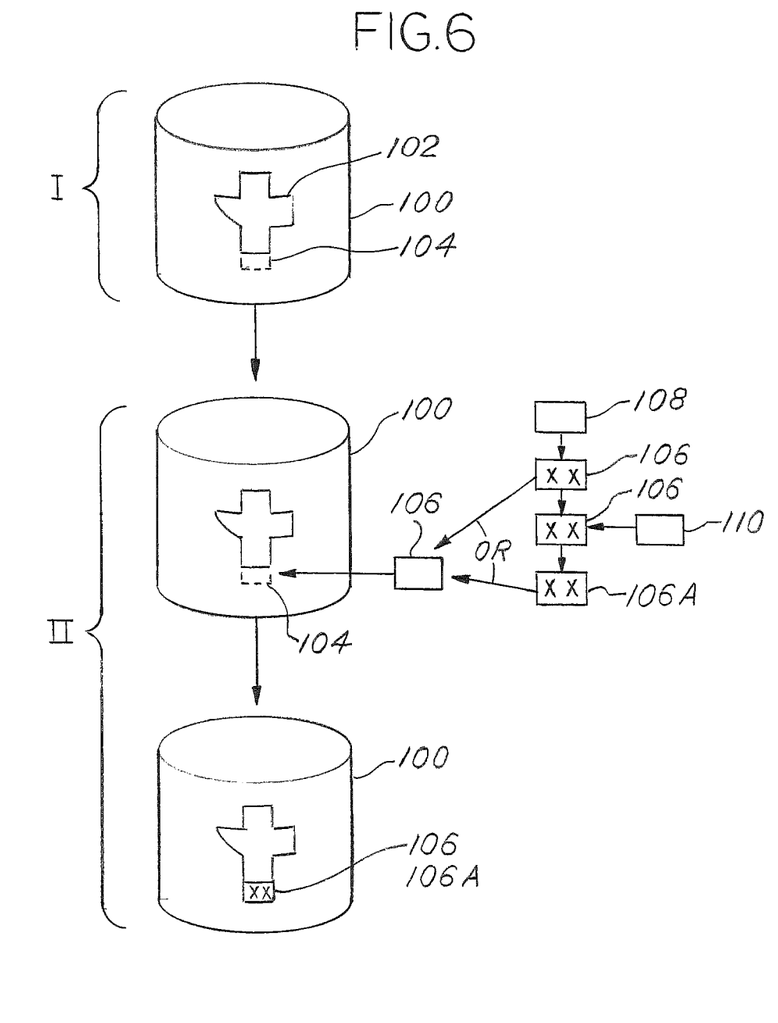
FIG. 6 is a flow diagram of an embodiment of the personalized article or product indicating the methodology of the manufacture of the product at a point of sale or a place of business separate and apart from the manufacture of the item which is being labeled.

Referring next to FIG. 6, there is illustrated again the previously described two options associated with the personalization of an item. Again, Step I is a representation of that which is accomplished at a general manufacturing site, such as a factory or the like. Thus, a mug 100 has affixed thereto a decal 102. The decal 102 is a generic decal of some sort. The decal 102 may include incorporated therein, or as a separate element, a designated personalization area 104. Step I thus is accomplished to provide a generically labeled item which can be mass produced at a factory site but is not personalized.

Next, personalization can occur at a point of sale or at a separate worksite, depending upon the circumstances. That is, a store or retail operation may take orders directly or on the internet with respect to personalization of items selected from the generic manufacturing, such as represented by Step I. The generic items can thus be made and later processed at a separate site in a manner wherein the designated area 104 may receive a personalized label 106. The label 106 is derived from a tape 108 which is imprinted to form the personal message and may be immediately applied on the decal designated area 104. Alternatively, the label 106 may be covered with a protective transparent or translucent layer 110 to provide a composite personalized label 106A which is applied to the designated area 104. The resultant label 106 or 106A then personalizes the item 100.

FIG. 7 illustrates yet another alternative. In this alternative, the first step, Step I is the creation of a generic item such as the creation of the mug 120 with a generic decal and a designated personalization area. Thus, Step II, which is the personalization step, occurs at a remote site such as a kiosk or some other separate site typically not the manufacturing site of Step I. With respect to Step III, a tape label with a personalized message; namely, tape label 122, is applied to a designated area 124 on the item or mug 120. Subsequently, a special cover layer 124 which is comprised of or includes an embossed or debossed frame section 126 surrounding a center transparent or translucent section 128 of carrier tape 130 is applied with the frame 126 generally coincident with the designated area in which the tape label 122 is positioned. Thus, the frame 126 overlies and surrounds the label 122 and the carrier 130 is thus positioned for removal and release. That is, the frame 126 includes a die cut perforation surrounding the frame 126 of the carrier strip 130. The carrier strip 130 includes an adhesive only on the underside of the frame portion or frame 126. Importantly, the center portion 128 surrounded by the frame 126 is embossed or debossed. The frame 126 thus has a raised or elevation relative to the window section 128 of the carrier tape 130. Thus, ultimately the personalized tape segment 122 is covered by a framed section 126 which may act as a protective layer.

To provide further protection an appropriately sized protective transparent layer 134 is placed over the assembly of the tape 122, the frame section layer 126. Careful choice of the elements comprising decal 120, the tape 122, the carrier strip 130 (frame section 126) and the protective layer 134 enable the creation of a personalized mug 120 wherein the personalization is provided in the designated area 124. Testing utilizing this series of steps and the designated materials demonstrate that a personalized label incorporated on and applied to an item or product and made in accord with the teachings set forth exhibits very high tolerance to a broad range of environmental temperature and use conditions.

Figure 8:
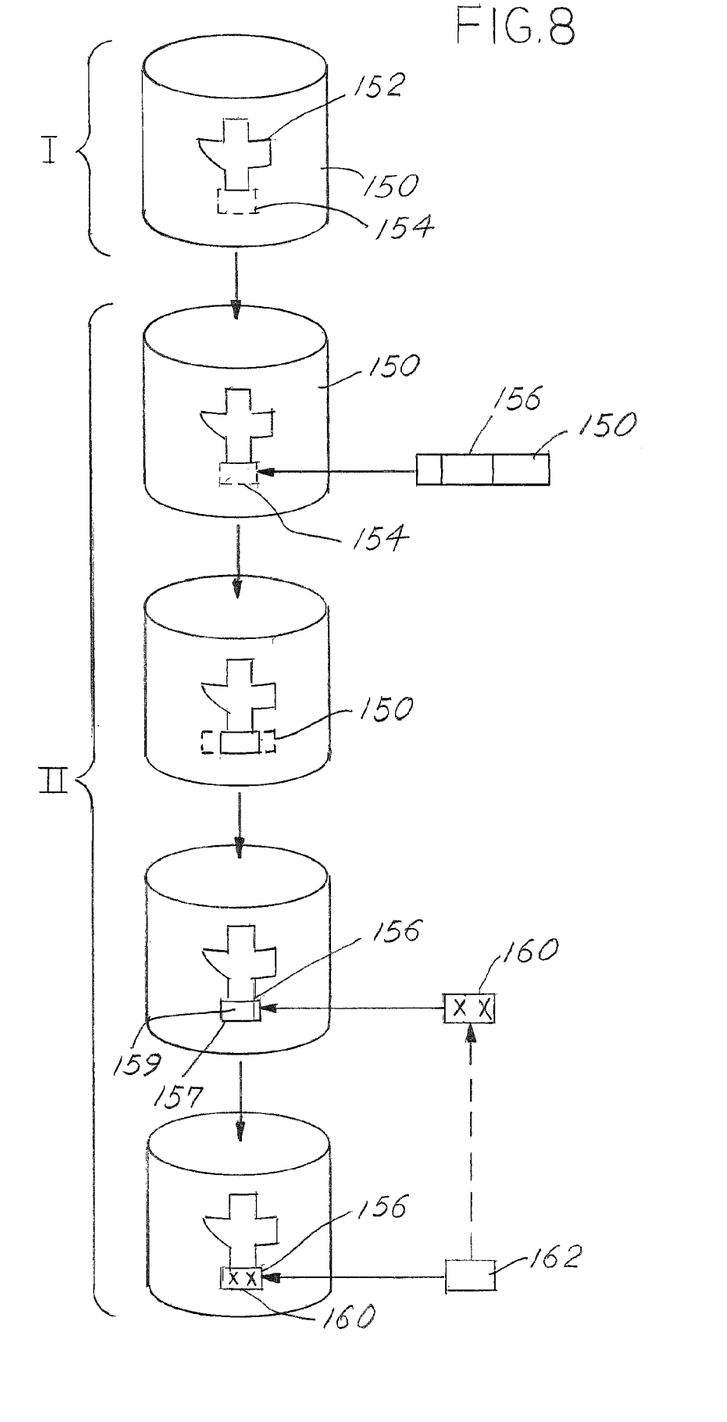
FIG. 8 is a flow diagram of steps in the practice of a third embodiment of the invention.

FIG. 8 represents another alternative scenario in the manufacture of a personalized item 150. The personalized item 150 includes a decal 152 as previously described. The decal 152 includes a designated area 154. As previously mentioned, the designated area 154 may be separate and apart from a specific decal 152 and, in fact, may be a separate decal-type element. The manufacturing Step I of a generic item 150 is accomplished at a factory or manufacturing site. Multiple replications of the starting product or item are thus created. Again, the items may be shipped to a point of sale site or a customization site for final processing to personalize the item.

Personalization of the item 150 is effected in accord with Step IV by first applying a frame element 156 mounted on a releasable die cut carrier tape layer 158 in the designated area 154. Subsequently, the excess carrier layer or tape 158 is removed. The adhesive on the underside of the frame portion 156 adheres the frame portion 156 to the designated area 154. Thereafter, a personalized tape element 160 is positioned within the frame portion 156. Again, the frame 156 includes a peripheral border or border section 157 which is raised or debossed relative to the interior section 159 so that the label 160 which is personalized may be appropriately positioned within the frame 156. A protective layer 162 may then be placed over the tape 160 within the frame 156. Alternatively, the protective layer 162 may be placed on the personalized tape 160 after the personalized information has been added thereto and before application to the frame portion 156.

The techniques and subject matter of the invention further may include combinations of the labeling system with quick response codes (QR codes for example). That is, a code personalized for an individual may be imprinted upon an item. Such an imprinting utilizing the techniques of application as set forth herein thereby immediately provides a high security yet extremely personal identifier for individuals. This combination of elements has multiple uses.

For example, if a person has a bracelet with their own personalized QR code thereon and a medical emergency occurs with respect to that person, the code, which is machine readable, can immediately be read by emergency personnel to facilitate the identification and the medical history, for example, as well as other pertinent information associated with that individual. Thus, personal health information may be accessed using this technique.

Another example illustrates the combination of the features and elements that comprise the invention: if a family attends a theme park, each member of the family as they enter the park may receive a charm or tag that is placed on a badge or key chain or the like. Each of the tag items may contain a personalized or a theme park QR code. Thus, each of the children in the family will have a code as will each of the adults. The QR code is personalized in that certain information such as the name, address and appropriate phone numbers may be included or so that access is possible through the code to the theme park registration authorities in order to protect privacy and provide additional useful information. In any event, if the child becomes lost, by way of example, the machine readable code can be easily accessed and read and the child may be more easily united with the parents.

Further, the code can include code information relating to the theme park that is accessible by use of a personal smart phone. The locations of rides, other park attractions, food service and emergency service locations can all be accessed by the individual having the personalized code which is provided as part of the admission process to the park.

Thus, placement of a QR code or some other machine readable code on an item such as a novelty item, a gift card, a medallion, a badge, a key chain or a plastic or metal dog tag upon payment for a ticket to an event and receipt of a personalized entry tag may enable not only access to information associated with the park but also provide information which will enhance the comfort and safety of the individual who has entered the park.

Further, utility associated with the combination of a code, such as a QR code that is unique to an individual, maybe incorporated in a label placed on an item such as a key chain or bracelet in a manner described herein and may be protected by a layer of a polyurethane material as described herein to enable individuals to have access to their own health record system and, in the case of an emergency, will enable responders to have access, for example, to appropriate information associated with an individual needing aid. A health care or health product provider may provide coded personal labels on badges or tags, for example. Such labels affixed to such a badge as described will be machine readable and could contain personal information such as health care information for that individual such as prescription requirements, blood type, allergies, etc.

The Quick Response (QR) code is a matrix bar code or two dimensional code that is standardized, encodes appropriate data and is machine readable. It was developed originally for the manufacturing industry. Utilization of such a code, by way of example, in combination with the other elements described herein expands the benefits associated with such a code. The invention, however, is not limited to a particular code but may include additional schemes or types of codes including standard bar codes and other optical or other types of readable codes that can be applied by means of a label to an item on an individual by individual basis. The described examples comprise only a few examples of the myriad that are possible using a combination of various elements as set forth herein.

Figure 9:
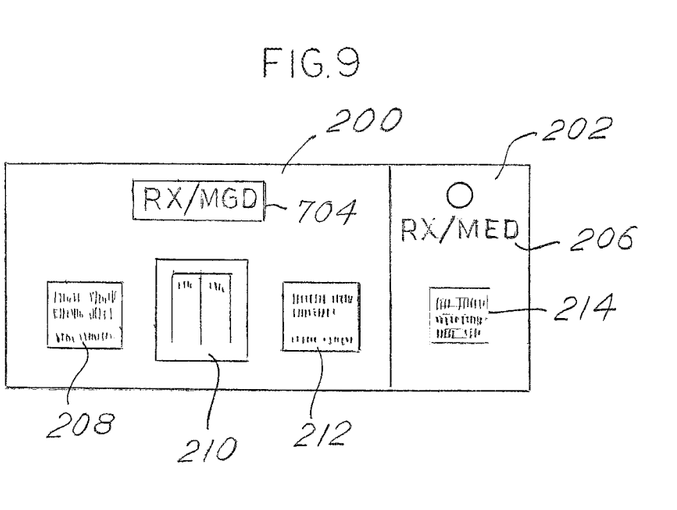
FIG. 9 is a diagrammatic view illustrating the utilization of the technology in association with an emergency medical alert card that may be prepared at a point of sale or distinct worksite and which can be utilized for transfer of information relating to the medical record and other information of an individual at or via any device capable of reading a QR code.

FIG. 9 is an example of the use of a QR code for use in association with a health record card or medication card. Thus, a plastic credit card, such as a plastic card 200, will include a tear off end or dog tag or key fob section 202 with, for example, the name of a pharmacy or medical emergency source, or some other generic information imprinted thereon or attached thereto by means of a decal 204 and 206. Additionally imprinted thereon are a series of one or more QR codes 208, 210 and 212 on the main card 200. The key fob or tear off card section 202 includes a QR code also. Because the card is typically comprised of a plastic material, the use of a protective layer of polyurethane over the entire card such as the 3M material previously identified is deemed highly desirable for covering the QR code printed at a point of sale or remote site on a generic card design.

The codes 208, 210, 212, 214 may provide the unique and disparate information which is readable, for example, by emergency providers, physicians, medical suppliers, pharmacies and the like. Each separate QR code 208, 210, 212 and 214 may thus have a unique lock code with respect to the information incorporated thereon. For example, if the QR code associated with a physician includes a lock for the code 210, access to that information would only be available upon recognition by the reading device of that particular QR code associated with the correct physician. In other words, the QR code would be self-protected and not be subject to abuse. The QR codes 212 and 214 could be associated or useful for any purpose and thus easily unlocked. Information associated with those codes would include, for example, emergency contacts, next of kin, names of attending physicians and other generic type information that would be associated with the individual that carries the card, including the identity of the individual. QR code information associated with another one of the QR codes, such as code 208, could be keyed for review only by a pharmacy or some other medical supplier. Thus, a single card could utilize multiple QR codes which would have medical information that is made available easily to first responders and secure codes that would be available only to other health suppliers or professionals.

In use, a dispensary of the QR codes would perhaps constitute a hospital or a pharmacy that would provide for the security necessary with respect to an individual whose name may imprinted on the card as well as the generic information associated with that particular individual, such as previously described as codes 212 and 214. Specialized information would also be made available, but only through a control service which would imprint the information and update it as necessary from time to time. For example, an insurance company may have a system whereby they would update the information in accord with a security program that enabled them to work with pharmacies, physicians, hospitals and the like. Also, pharmacies could be the control agent which would, at a separate site, separate and apart from their own dispensary operation provide for personalization of the QR codes for their customers. They could update the data as necessary by retrieving the issued card from a customer and updating or replacing the necessary coded information. The card could then be available for the customer to use at a pharmacy, assuming the customer could authenticate the card in some manner, for example, by a PIN number chosen by the pharmacy or the customer. The card could then be used for multiple purposes at multiple outlets and in appropriate circumstances integrated with insurance coverage verification for prescription payment.

Thus, variations with respect to the practice of the invention and the creation of a product are limited only by the following claims and equivalents thereof.

What is claimed is:

1. A personalized decal assembly for memorabilia products, comprising:
   (a) a memorabilia product at a point of sale having a hard application substrate;
   (b) a general design decal affixed to the application substrate comprising a label having an adhesive material on an inner surface, an outer surface, a generic design visibly apparent when said outer surface is viewed, and a locator region on the outer surface, said adhesive material applied to the surface of the application substrate; and
   (c) a separate, printable tape label printed at a point of sale with a unique printing, the tape label is affixed to the locator region, said tape label comprising a laminated combination of layers including a printed layer where the unique printing at the point of sale is associated with the purchaser of the memorabilia product, an acrylic adhesive separating a removable layer from a printed layer, wherein remaining layers of tape label are affixed to the locator region via the acrylic adhesive after removal of the removable layer, wherein the memorabilia product is from a group consisting of mugs, glass containers, glass drinkware, stainless steel containers, stainless steel drinkware, porcelain plaques, key chains, badges, medallions, tags or charms.

2. The assembly of claim 1 wherein the decal is an organic lead-free material.

3. The assembly of claim 2 further including a polyurethane tape as an outer layer covering the remaining layers of the tape label that is affixed to the product.

4. The assembly of claim 1 further including a polyurethane tape as an outer layer covering the remaining layers of the sale of tape label that is affixed to the product.

5. The assembly of claim 4 wherein the polyurethane tape is embossed with a raised frame border section surrounding a transparent section surrounded by the framed border section.

6. The assembly claim 1 wherein the application substrate of the product is selected from the group consisting of porcelain, ceramic, metal, glass, and combinations thereof.

7. The assembly claim 1 wherein the decal includes a resin coating on the outer surface to increase the adhesion between the outer surface of the general decal and the tape label.

8. The assembly of claim 1 wherein the tape label further includes a machine readable code.

9. The assembly of claim 8 wherein the code is a Quick Response (QR) Code.

10. The assembly of claim 8 wherein the code comprises personal information of a selected individual and the information is available in the machine readable code that is applied to the tape label and available with use of devices configured to scan the code and access the internet.

11. The assembly of claim 10 wherein the code further comprises information that is not personal.

12. The assembly of claim 8 wherein the code comprises information that is not personal and the information is available in the machine readable code that is applied to the tape label and available with use of devices configured to scan the code and access the internet.

13. The assembly of claim 1 wherein the unique printing is includes at least one of a name, date, address, telephone number, theme park ticket access, medical information or other information associated with the purchaser of the memorabilia product or one known by the purchaser of the memorabilia product.

14. A personalized decal assembly for memorabilia products, comprising:
   (a) a memorabilia product at a point of sale having a hard application substrate;
   (b) a general design decal affixed to the application substrate comprising a label having an adhesive material on an inner surface, an outer surface, a generic design visibly apparent when said outer surface is viewed, and a locator region on the outer surface, said adhesive material applied to the surface of the application substrate;
   (c) a separate, printable tape label printed at a point of sale with a unique printing, the tape label is affixed to the locator region, said tape label comprising a laminated combination of layers including a printed layer where the unique printing at the point of sale is associated with the purchaser of the memorabilia product, and an acrylic adhesive separating a removable layer from a printed layer, wherein remaining layers of tape label are affixed to the locator region via the acrylic adhesive after removal of the removable layer; and
   (d) a polyurethane tape as an outer layer covering the remaining layers of the tape label that is affixed to the product, the polyurethane tape is embossed with a raised frame border section surrounding a transparent section surrounded by the framed border section.

* * * * *